United States Patent
Ramakrishnan et al.

(10) Patent No.: US 7,644,158 B2
(45) Date of Patent: *Jan. 5, 2010

(54) METHOD FOR IMPLEMENTING AN INTERNET PROTOCOL (IP) CHARGING AND RATING MIDDLEWARE PLATFORM AND GATEWAY SYSTEM

(75) Inventors: Karthik Ramakrishnan, Burlington (CA); Ian Gordon Collett, München (DE); Rubens Rahim, Markham (CA)

(73) Assignee: Redknee Inc. (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/264,137

(22) Filed: Nov. 3, 2008

(65) Prior Publication Data

US 2009/0133114 A1    May 21, 2009

Related U.S. Application Data

(63) Continuation of application No. 10/348,972, filed on Jan. 23, 2003, now Pat. No. 7,457,865.

(51) Int. Cl.
*G06F 15/173* (2006.01)
(52) U.S. Cl. .................. 709/224; 709/223; 709/225; 709/227; 709/229
(58) Field of Classification Search ......... 709/223–225, 709/227, 229
See application file for complete search history.

(56) References Cited

U.S. PATENT DOCUMENTS 6,473,622 B1  10/2002  Meuronen

| | | |
|---|---|---|
| 6,611,875 B1 | 8/2003 | Chopra et al. |
| 6,615,262 B2 * | 9/2003 | Schweitzer et al. ......... 709/224 |
| 6,621,793 B2 | 9/2003 | Widegren et al. |
| 6,661,780 B2 | 12/2003 | Li |

(Continued)

FOREIGN PATENT DOCUMENTS

DE    10148540 A1    4/2003

(Continued)

OTHER PUBLICATIONS

Salkintzis, A. et al. —"Seamless multimedia Qos across UMTS and WLANs", IEE Wireless Communications, Apr. 2005.

(Continued)

*Primary Examiner*—Nathan Flynn
*Assistant Examiner*—Mohamed Wasel
(74) *Attorney, Agent, or Firm*—Katten Muchin Rosenman LLP

(57) ABSTRACT

A method for Internet Protocol (IP) charging and rating gateway within a system having a proxy server for connection to an Authentication, Authorization, and Accounting (AAA) server, an access gateway, an IP classification engine for connection between a data network and the access gateway and a gateway controller connected to the proxy server and the IP classification engine, including the steps of receiving IP packets at the IP classification engine, the IP packets originating from the data network and destined for a subscriber device via the access gateway, classifying the IP packets according to the protocol of each of the packets at the IP classification engine and selectively instructing the IP classification engine to permit or deny the flow of IP packets between the data network and the access gateway at the gateway controller. Preferably, the proxy server is configured to emulate the access gateway and the AAA server.

17 Claims, 3 Drawing Sheets

U.S. PATENT DOCUMENTS

| | | | |
|---|---|---|---|
| 6,667,780 B2 | 12/2003 | Cho | |
| 6,714,515 B1 | 3/2004 | Marchand | |
| 6,718,380 B1 | 4/2004 | Mohaban et al. | |
| 6,775,267 B1 | 8/2004 | Kung et al. | |
| 6,785,534 B2 | 8/2004 | Ung | |
| 6,847,708 B1 | 1/2005 | Abbasi et al. | |
| 6,891,811 B1 | 5/2005 | Smith et al. | |
| 6,895,235 B2 | 5/2005 | Padgett et al. | |
| 6,947,531 B1 | 9/2005 | Lewis et al. | |
| 7,003,307 B1 | 2/2006 | Kupsh et al. | |
| 7,039,037 B2* | 5/2006 | Wang et al. | 370/349 |
| 7,107,068 B2 | 9/2006 | Benzon et al. | |
| 7,139,387 B2 | 11/2006 | Dahari | |
| 7,194,235 B2 | 3/2007 | Nykanen et al. | |
| 7,215,970 B2 | 5/2007 | Corrigan et al. | |
| 7,269,431 B1 | 9/2007 | Gilbert | |
| 7,272,133 B2 | 9/2007 | Valin et al. | |
| 7,302,254 B2 | 11/2007 | Valloppillil | |
| 7,340,214 B1 | 3/2008 | Hamberg | |
| 2001/0026553 A1 | 10/2001 | Gallant et al. | |
| 2001/0053687 A1 | 12/2001 | Sivula | |
| 2001/0055291 A1 | 12/2001 | Schweitzer | |
| 2002/0052754 A1 | 5/2002 | Joyce et al. | |
| 2002/0103925 A1 | 8/2002 | Sheth et al. | |
| 2002/0107754 A1 | 8/2002 | Stone | |
| 2002/0126701 A1 | 9/2002 | Requena | |
| 2002/0152319 A1 | 10/2002 | Amin et al. | |
| 2002/0152321 A1 | 10/2002 | Le et al. | |
| 2002/0176378 A1 | 11/2002 | Hamilton et al. | |
| 2003/0003932 A1 | 1/2003 | Corrigan et al. | |
| 2003/0009580 A1 | 1/2003 | Chen et al. | |
| 2003/0035409 A1* | 2/2003 | Wang et al. | 370/349 |
| 2003/0051041 A1 | 3/2003 | Kalavade et al. | |
| 2003/0069922 A1 | 4/2003 | Arunachalam | |
| 2003/0074286 A1 | 4/2003 | Rodrigo | |
| 2003/0083990 A1 | 5/2003 | Berg et al. | |
| 2003/0096605 A1 | 5/2003 | Schlieben et al. | |
| 2003/0105720 A1 | 6/2003 | Ishibashi | |
| 2003/0105864 A1 | 6/2003 | Mulligan et al. | |
| 2003/0112936 A1 | 6/2003 | Brown et al. | |
| 2003/0134615 A1 | 7/2003 | Takeuchi | |
| 2003/0157925 A1 | 8/2003 | Sorber et al. | |
| 2003/0158902 A1 | 8/2003 | Volach | |
| 2003/0187996 A1 | 10/2003 | Cardina et al. | |
| 2003/0207686 A1* | 11/2003 | Ramanna et al. | 455/435.1 |
| 2003/0214958 A1* | 11/2003 | Madour et al. | 370/401 |
| 2004/0022191 A1 | 2/2004 | Bernet et al. | |
| 2004/0028055 A1* | 2/2004 | Madour et al. | 370/395.21 |
| 2004/0066769 A1* | 4/2004 | Ahmavaara et al. | 370/338 |
| 2004/0092250 A1 | 5/2004 | Valloppillil | |
| 2004/0092272 A1 | 5/2004 | Valloppillil | |
| 2004/0095924 A1* | 5/2004 | Holur et al. | 370/352 |
| 2004/0105424 A1 | 6/2004 | Skoczkowski et al. | |
| 2004/0117312 A1 | 6/2004 | Lialiamou et al. | |
| 2004/0127215 A1 | 7/2004 | Shaw | |
| 2004/0236686 A1* | 11/2004 | Bohmer et al. | 705/40 |
| 2005/0100035 A1 | 5/2005 | Chiou et al. | |
| 2005/0131984 A1 | 6/2005 | Hofmann et al. | |
| 2005/0185661 A1 | 8/2005 | Scott et al. | |
| 2005/0185664 A1 | 8/2005 | Chaskar et al. | |
| 2005/0195743 A1* | 9/2005 | Rochberger et al. | 370/235 |
| 2005/0272465 A1* | 12/2005 | Ahmavaara et al. | 455/552.1 |
| 2006/0008063 A1* | 1/2006 | Harnesk et al. | 379/114.01 |
| 2006/0028980 A1 | 2/2006 | Wright | |
| 2006/0031297 A1 | 2/2006 | Zuidema | |
| 2006/0039374 A1* | 2/2006 | Belz et al. | 370/389 |
| 2006/0075467 A1 | 4/2006 | Sanda et al. | |
| 2008/0013531 A1 | 1/2008 | Elliott et al. | |

FOREIGN PATENT DOCUMENTS

| | | |
|---|---|---|
| EP | 1 026 853 A1 | 8/2000 |
| EP | 1 278 359 A2 | 1/2003 |
| EP | 1 278 383 A | 1/2003 |
| EP | 1 298 599 A1 | 4/2003 |
| EP | 1 309 213 A | 5/2003 |
| EP | 1 320 214 A1 | 6/2003 |
| EP | 1 278 359 A3 | 6/2004 |
| EP | 1 278 359 B1 | 3/2007 |
| WO | 01/63883 A2 | 8/2001 |
| WO | 01/69891 A1 | 9/2001 |
| WO | 03/032618 A1 | 4/2003 |
| WO | 03/037023 A | 5/2003 |
| WO | 03/047164 A2 | 5/2003 |
| WO | 2007/138407 A2 | 12/2007 |

OTHER PUBLICATIONS

Cheung et al. "Applying a Service-on-Demand Policy Management Framework to an ETTx Environment", NOMS, 2004, IEEE/IFIP vol. 2, Issue 23, Apr. 2004, pp. 101-114.

International Search Report for International Application No. PCT/CA2007/002372.

3GPP TS 23.203 V7.4.0—"3rd Generation Partnership Project; Technical Specification Group Services and System Aspects: Policy and Charging Control Architecture" (release 7) Sep. 26, 2007 Retrieved From the Internet: <http://www.3gpp.orgftp/Spccslarchive/23_scriesl23.203/23203-740.zip> pp. 11-30,42,47-48,58-59.

Dippelhofer A: "Flexible Abrechnung" Jan. 17, 2003, pp. 34-36, XP001164781, ISSN: 0016-2814.

Lin, Y et al.: "Mobile Prepaid Phone Services" IEEE Personal Communications, Jun. 2000, pp. 6-14, XP011092391.

Ganna, M. et al. "On using policies for managing services provisioning in agent-based heterogeneous environments for mobile users" Sixth IEEE International Workshop on Policies for Distributed Systems and Networks, Jun. 6-8, 2005; pp. 149-158.

D. Fonknechten, et al., "Service Aware Intelligent GGSN," Alcaltel Telecommunications Review, 4th Quarter 2003 (11pp.).

* cited by examiner

METHOD FOR IMPLEMENTING AN INTERNET PROTOCOL (IP) CHARGING AND RATING MIDDLEWARE PLATFORM AND GATEWAY SYSTEM

CROSS-REFERENCE TO RELATED APPLICATIONS

This is a continuation of U.S. application Ser. No. 10,348,972 now U.S. Pat. No. 7,457,865, filed Jan. 23, 2003, and is generally related to U.S. patent application Ser. No. 10/307,335, filed Dec. 2, 2002, the entire contents of each of which is incorporated herein by reference.

BACKGROUND

With the evolution and migration of Internet and related informational services to mobile and/or wireless handsets, devices and so on, telecommunications network operators are constantly seeking enhanced ways of rating for their respective data services. The prior art demonstrates considerable limitations, weaknesses and infirmities in this regard.

Consider U.S. Patent Application 20010055291 by Schweitzer, entitled System, method and computer program product for charging for competitive IP-over-wireless service, which details a means for charging Internet Protocol (IP) traffic but no substantial means for differentiating the traffic therein. Similarly, European Patent Application (EP) 1026853 by Yamaguchi et al., entitled Charging Method for Information Communication Network, teaches of art directed at merely counting the number of packets exchanged and nothing again of rating the different types of packets therein according to their pre-established utility and/or value.

Additionally, art which does address the problem of classifying IP traffic remains insufficient or lacks the sophistication of that of present. As with U.S. Patent Application 20020152321 by Le et al., entitled Method and apparatus for classifying IP data, makes reference to classifying said IP packets based only on IP header fields—basically Layer two (2) of the OSI stack (said stack has seven (7) layers). Our method disclosed goes well beyond Layer two (2) and involves classifying packets based on information obtained from Layer two (2) through to Layer seven (7). (For example, Multi-Media Service (MMS) classification performed by the disclosed invention depends on information obtained from layer six (6) and layer seven (7)). Our classification methodology incorporates correlation of data within the seven (7) layers to classify a packet. And similarly, U.S. Patent Application 20020103925 by Sheth et al., entitled Generic programmable internet protocol classification technique for a broadband engine, concentrates on IP classification specifically at the IPv4 header (i.e. layer 2/3). The art thereof is primarily directed at classification for more or less quality of service (QoS) reasons (indeed, the same can be said of the art identified former) and providing differentiated services. Our art is directed primarily at classification for the purpose of packet and application level data type identification(s).

Note also U.S. Patent Application 20020152321 October, 2002 Le et al. 709/238; U.S. Patent Application 20020103925 August, 2002 Sheth et al. 709/236; U.S. Patent Application 20010055291 December, 2001 Schweitzer 370/337; Foreign Patent Document(s) 1026853 August, 2000 EPO.

TECHNICAL FIELD

The present invention relates generally to wireless communications and gateway services; and more specifically, to a method for implementing an Internet Protocol (IP) charging and rating middleware platform and gateway system.

SUMMARY OF THE INVENTION

The Internet Protocol (IP) charging and rating middleware platform and gateway system disclosed herewith is intended to equip, in this instance, telecommunications network operators with the ability to rate and bill IP traffic (such as File Transfer Protocol (FTP) and HyperText Transfer Protocol (HTTP)) based upon any number of informational variables, including volume, quality of service, source address, destination address, and/or time of day. The art also accommodates differentiated billing based upon service type, including Wireless Application Protocol (WAP), Multimedia Message Service (MMS), and other services which utilize the Internet Protocol (IP) as the transport protocol.

The implementation of the architecture preferentially resides at the access gateway point, between the telecommunication provider's and/or wireless operator's IP network (as for instance, GGSN (Gateway GPRS (General Packet Radio Service) Support Node) based or PDSN (Packet Data Service Node) based and the Internet/Intranet. The IP charging and rating middleware platform and gateway system effectively allows for the inspection of IP traffic at definable points within the packet information.

For the purposes of simplicity and elucidation, the architecture of the Internet Protocol (IP) charging and rating middleware platform and gateway system may be divided functionally among the IP Classification Engine (the core of the art seeking protection of Letters Patent) and the residual art, the IP charging controllers.

Inherent to the technology and methodology of the IP Classification Engine (IPCE) remain the rating rules. Such rules are loaded into the IPCE, whereupon a series of system level triggers are then armed to detect the occurrence of certain events as per the existing rating criteria. The arming of triggers and generation of event sets, providing specific charging and/or informational events form the functional foundation of the IPCE.

Triggers may be armed on a real time basis through the provisioning interface which link to a set of underlying Application Programming Interface's (API's) (in this instance), thereby providing application control for non-limiting instantiations of protocol state, destination URL or address, Time of Day, volume message content or type, and text string, among others. Indeed, those skilled in the art shall recognize that a variety of object oriented application programming interfaces will serve the purpose of notification without affecting the intent and scope of the present invention. Triggers may also be armed on a protocol-specific level, including among others, HTTP, POP3, SMTP, FTP, MMS, and WAP.

The IPCE also provides the logic for the blocking of data wherever said subscriber has insufficient funds.

The IP charging controllers in this instance represent much of the residual, generic components of the Internet Protocol (IP) charging and rating middleware platform and gateway system as performing balance queries (which decrements the usage values on each subscriber's temporary token account store, after applying rating specific charges on the data flow information, in real time) and other intermediating functions.

DETAILED DESCRIPTION OF THE PREFERRED EMBODIMENTS

Figure 1:
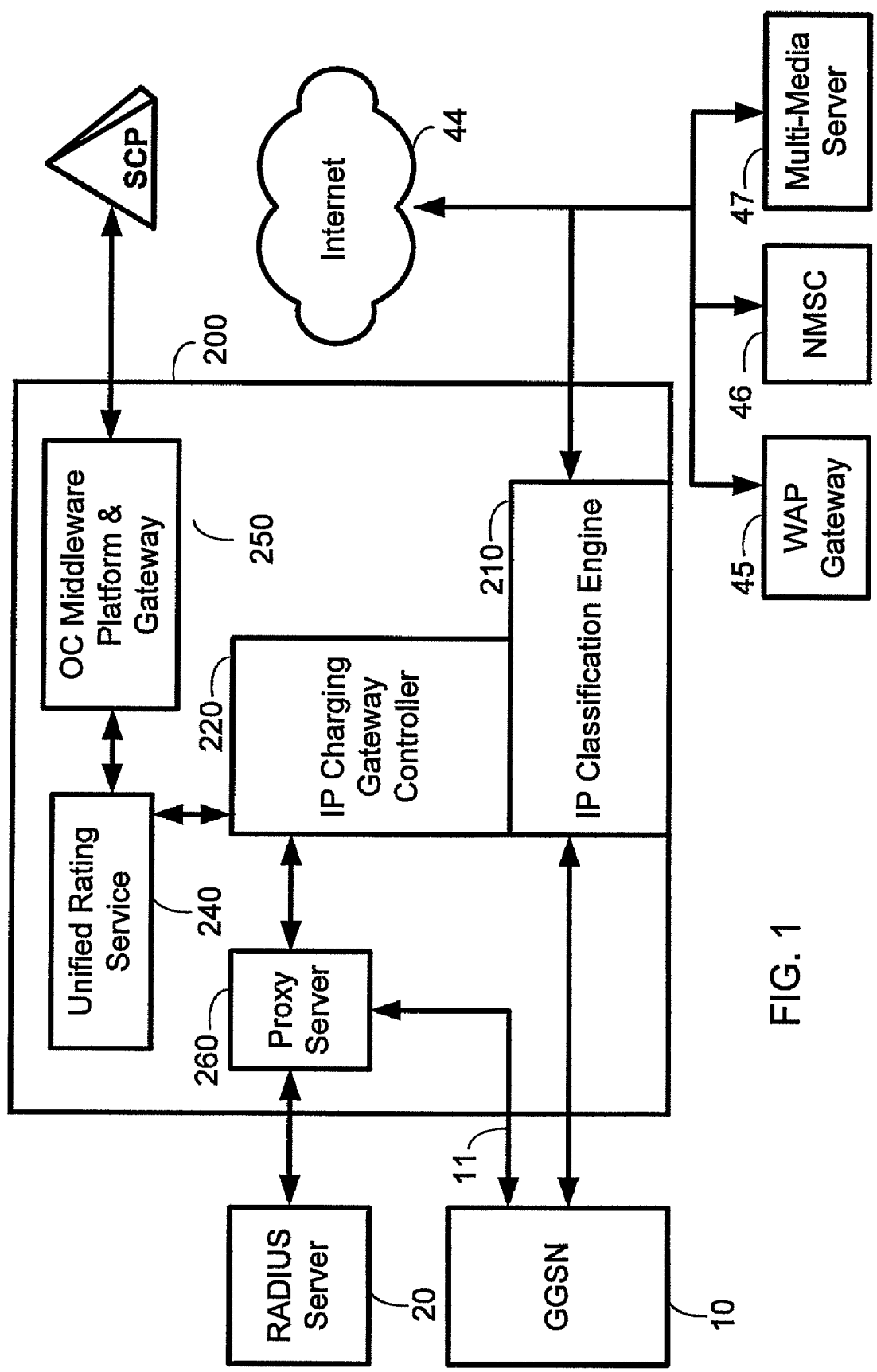
FIG. 1 illustrates a typical, non-limiting embodiment of the system level architecture employed in the disclosure of present.

With reference to FIG. 1, wherever a mobile subscriber seeks to access the Internet 44 and/or related informational services via 45, 46, 47 (WAP Gateway, NMSC or Multi-Media Server, respectively), the GGSN 10 sends via the RADIUS protocol 11, an authorization request to the RADIUS Proxy Server 260 of the Internet Protocol (IP) charging and rating middleware platform and gateway system 200. Technicians skilled in the art will recognize that mobile subscriber's may wish to access content at their wireless handset and/or other similar wireless device other than those delimited prior without diluting the intent and scope of the invention of present. Further still, those practitioners will also recognize that a variety of protocols, including Authentication, Authorization, and Accounting (AAA) protocols, will satisfy the implementation of said architecture without affecting the intent and scope of the present invention. Fundamentally, the Internet Protocol (IP) charging and rating middleware platform and gateway system 200 resides between the GGSN 10 and the Master RADIUS server 20; in a lay manner, the GGSN 10 simply presupposes the gateway system 200 is the Master RADIUS server 20, and vice versa.

Continuing with reference to FIG. 1, the RADIUS Proxy Server 260 checks the master data to confirm that the account in question is active, via LDAP or RADIUS. Practitioners skilled in the art shall recognize that a variety of protocols will satisfy the implementation of said architecture without affecting the intent and scope of the present invention. Where the returned response is negative (not shown) an authorization reject 11 is returned to the GGSN.

The gateway system 200, makes a request to an Open Charging (OC) middleware platform and gateway system 250 as detailed in patent application Ser. No. 10/307,335 to confirm the status of the account in question and related profile capabilities. Technicians skilled in the art will recognize that the invention of present need not be limited to the aforementioned Open Charging (OC) middleware platform and gateway system and other similar network implementations may be employed without diluting the intent and scope as such.

The Open Charging (OC) middleware platform and gateway system 250 accesses the subscriber account server (SCP), removing the access charge from the account (prepaid). Where the account can not support the requested charge then a negative response is returned (not shown) and a negative authorization is passed 11 to the GGSN as a failed access request.

From the Unified Rating Service 240 the user profile in question is recovered. In the preferred embodiment, assuming both the account check, and the profile were positive an authorization accept 11 is returned to the GGSN 10 via the gateway system's 200 RADIUS Proxy server 260.

The gateway system 200 preloads the said user profile and loads the rating plans (detailed further in FIG. 2A and FIG. 2B), as a result, when the first user data packet is received the gateway controller 220, already has a complete user profile built.

So thus, still in reference in FIG. 1 now, whenever the mobile subscriber initiates a data session 12 and the RADIUS Proxy Server 260 triggers the gateway controller 220 with the subscriber specific identification parameters such as the IP address, MSISDN, APN etc., said controller 220 makes a token reservation request to OCG's Prepay Account Manager 250 application in order to obtain a certain amount of usage quota; 250 responds with a the requested number of credits/quota for consumption, for a particular ID.

Simultaneously, the gateway controller 220 obtains the rating and charging information 240 specific to the subscriber. The gateway controller 220 then arms the IPCE 210 with the appropriate information, including MSISDN, IP address, the rating specific inspection criteria etc.

IPCE 210 then internally arms the respective IP Flow Classification triggers (not shown) associated with the specific information. For example, the Flow Classification might specify the URL's allowed for the subscriber, the blocking of streaming service etc. The subscriber specific information is in addition to the regular usage statistic detectors. These generic IP Flow Classifiers perform accounting of usage on IP addresses, ports, protocols and maintain the user state information within the several IP flows.

Where events corresponding to these trigger points occur, the IP Flow Classifiers update the Internet Protocol (IP) charging and rating middleware platform and gateway system 200 accounting interface (not shown), which monitors the usage related to each type of data flow within the user data session.

The Internet Protocol (IP) charging and rating middleware platform and gateway system 200 decrements the usage details from the allocated quota. Periodically, these usage statistics are updated on the gateway controller 220, which applies the charging to the usage information with rating information and decrements the credits reserved. Where the allocated tokens are exhausted, a token confirmation report is sent to OCG's Prepay Server 250, in order to debit the users account balance and simultaneously reserve additional credit/quota and allocation of usage quotas.

Figure 2A:
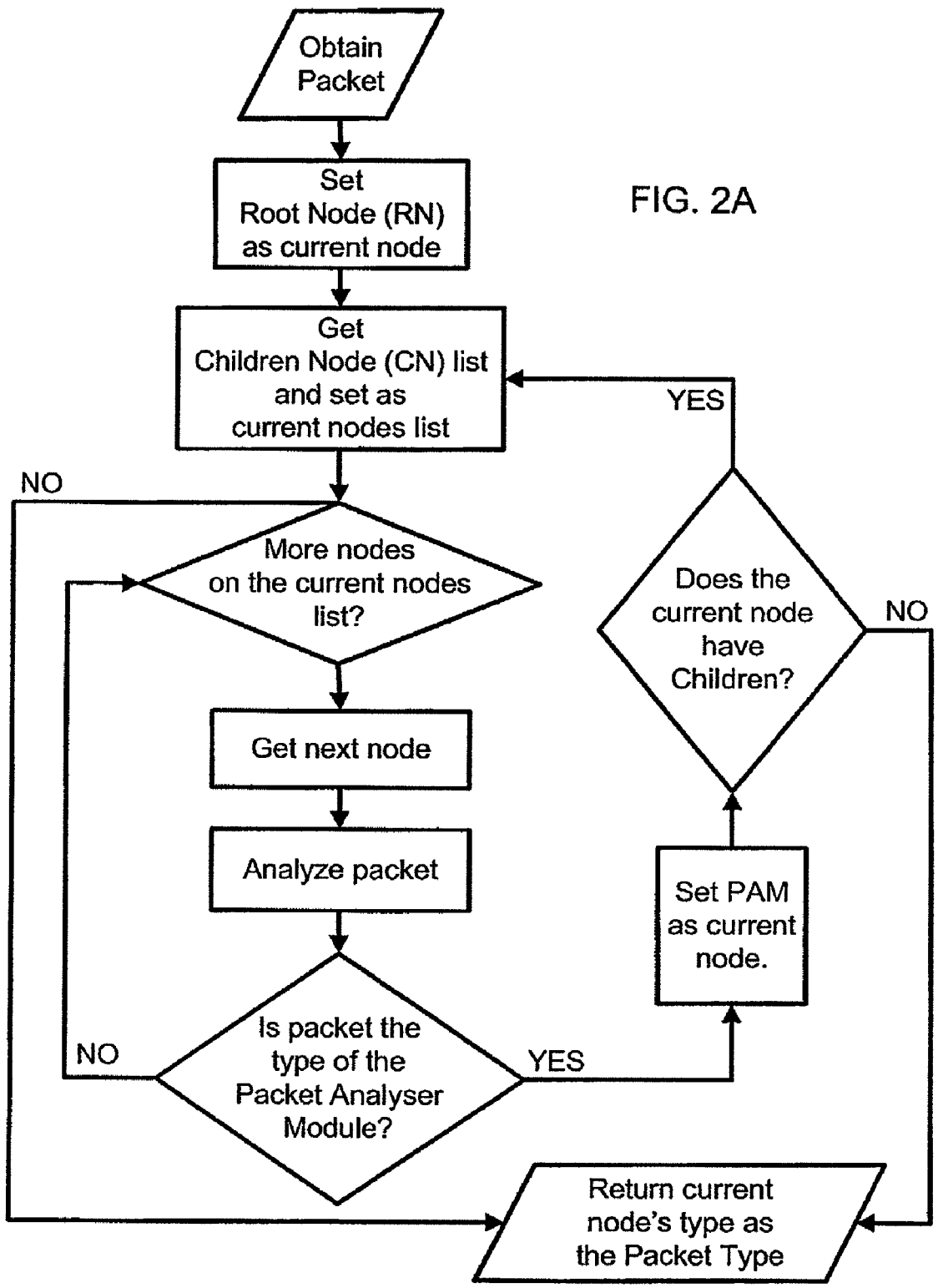
FIG. 2A and FIG. 2B illustrate the Internet Protocol (IP) rating and classification techniques, methods and advances pertinent to the Internet Protocol (IP) charging and rating middleware platform and gateway system disclosed herein.
Figure 2B:
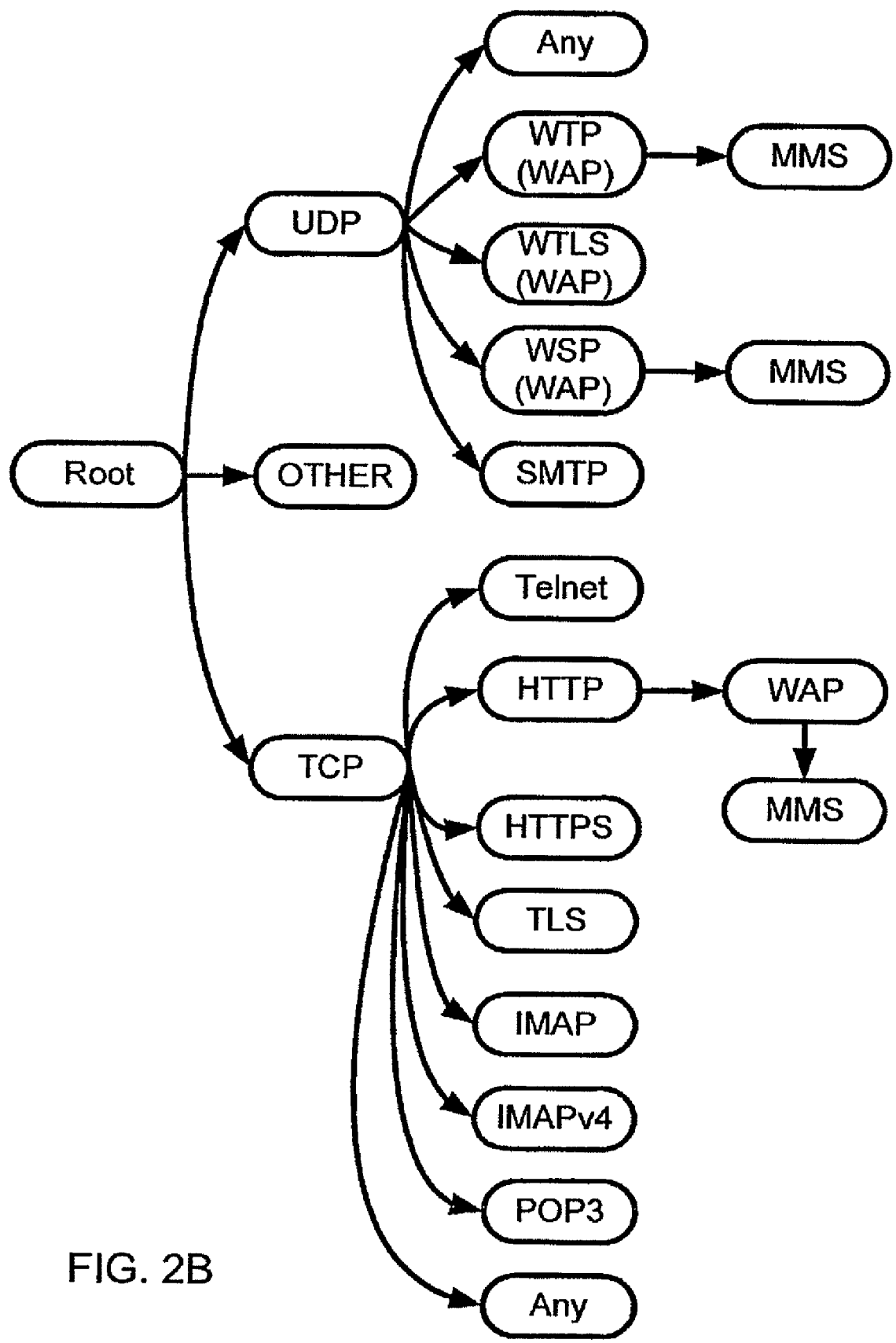

The Packet Analyzer component of the IP Classification Engine (IPCE) instantiates and configures itself using the downloaded IP Classification Modules Registry. It creates a decision tree based on the IP Classification Modules registry for analyzing and determining packet types. FIG. 2A and FIG. 2B serve to delineate these processes.

When a packet is captured, it is passed onto the Packet Analyzer. If the source and destination IP addresses are not blocked, the Packet Analyzer obtains a copy of the packet and immediately re-releases the packet into the network. (Blocked packets are copied and dropped within the system. However, if the source or destination IP addresses or ports are defined to be free, the message is forwarded regardless of the blocking logic.) Using the copy of the captured packet, the Packet Analyzer determines the packet type using the decision tree of FIG. 2A.

For commercial purposes it must be recognized that only chargeable packets may be analyzed.

When the packet type is determined, the Rating and Charging Component of the IP Classification Engine is notified.

The IP Classification Modules (IPCM) Registry is used to specify the logic for analyzing the packets. It specifies a decision tree for determining the packet type of each packet; it also specifies the IP Classification module to be used for determining each packet type As explicated earlier with reference to FIG. 1, to enable all the above features of the Internet Protocol (IP) charging and rating middleware platform and gateway system, the Unified Rating Service (URS) on the control plane (i.e. service logic plane) is invoked to arm Flow Classification triggers on the data plane (i.e. user traffic plane). When a subscriber starts a data session, the standard and subscriber specific rating information is loaded from the URS onto the IPCE through the Controllers.

Based on this rating profile, the appropriate Flow Classification triggers are armed within the IPCE. During regular inspection of IP flows, when a set of events corresponding to the armed triggers occurs in the data plane, the control plane service logic is triggered to take control of the IP flow to perform further analysis, accounting, routing and control of the session.

Protocols such as FTP, POP, RTP/RTSP and SMTP have well-defined state machines where the service logic session information can indicate when a state has been reached. On the contrary, HTTP does not have well-defined state machines, but can be inspected in a way such that service logic can indicate when a state has been reached. For example, the control plane service logic has been implemented to start the counting the number and type of bytes transported after a HTTP GET Response has been detected. The accounting of packets is terminated when a TCP FIN is detected. Further refined service logic has also been implemented in the service logic of the IPCE, to detect content based on Layer 7 information. For example, particular internet content may have restricted access, or may be free of charge.

Consider further the advances achieved by the IPCM in providing a unique way of identifying and classifying MMS traffic for rating purposes. Now, MMS traffic is usually transported over the standard WAP protocol stack within a GPRS network; the IP Classification Flow Monitors detect MMS traffic within the WAP protocol stack through the 'Content Type' field within the WSP layer of the WAP protocol or the presence of the MMSC URI in the GET header of the WSP layer of the WAP protocol. All WAP messages with the same Transaction ID as the original MMS packets are considered to be part of the MMS message stream. To ensure that all packets related to a MMS message are correctly rated, session-management is required to correlate all traffic with the same Transaction ID (in the WTP layer).

Grouping by Transaction ID is terminated by either a time-based counter or the arrival of an 'Abort (0 x 04) PDU within the Wireless Transaction Protocol layer.

Tables 1A and 1B have been included herewith to further elucidate these advances.

TABLE 1B

MMS Traffic Identification

| Layer | Field | Description |
|---|---|---|
| Frame | Packet Length | The size of the packet. Value is used as the size of the packet during IP rating. Packet Length is presented in bytes.. |
| Internet Protocol | Source/Destination | The source or destination IP address. Used to identify the subscriber. |
| Wireless Transaction Protocol | Transaction ID | Assigned transaction ID used to correlate all transactions within the subscriber-initiated session. |

The Internet Protocol (IP) charging and rating middleware platform and gateway system obtains the usage accounting information (not shown), applies the associated rating information to calculate the incurred charge to the subscriber and decrements that from the quota allocated by the Prepaid Application Manager, in the case of prepaid subscribers. When the allocated quota has been depleted (or lower than a defined threshold) the quota usage is confirmed with a request for more. In the event that the subscriber has no more balance in their prepaid account, it is possible to selectively drop the subscriber packets, or direct them to a top-up site, depending on the subscriber specific rating information. In the case of post paid subscribers, the appropriate usage CDR's (or similar type Event Records) are generated for transfer to the network billing system.

What is claimed is:

1. A method for Internet Protocol (IP) charging and rating gateway within an IP charging and rating gateway system, said system comprising:

a proxy server for connection to an Authentication, Authorization, and Accounting (AAA) server;

an access gateway, said proxy server configured to reside between said AAA server and said access gateway, said proxy server further configured to emulate said access gateway such that when said AAA server communicates with said proxy server said AAA server presupposes that said AAA server is communicating with said access gateway, said proxy server further configured to emulate said AAA server such that when said access gateway

TABLE 1A

MMS Traffic Identification

| Layer | Field | Value |
|---|---|---|
| Wireless Transaction Protocol | Transaction ID | Transaction ID compared against existing transaction ID for MMS traffic streams. If the transaction ID matches an existing MMS traffic stream, it is automatically identified as MMS traffic. |
| Wireless Session Protocol | Content Type | e.g. 'application/vnd.wap.mms-Protocol message' |
| Wireless Session Protocol | URI (where Content Type is unavailable). | The URI of the serving MMSC. |
| Wireless Session Protocol | PDU Type URI | e.g. Get (0 x 40) http://[MMSC URI]?message-id=XXXXXX | communicates with said proxy server said access gateway presupposes said access server is in communication with said AAA server;

an IP classification engine for connection between a data network and said access gateway; and a gateway controller connected to said proxy server and said IP classification engine, said method comprising: receiving IP packets at said IP classification engine, said IP packets originating from said data network and destined for a subscriber device via said access gateway;

classifying said IP packets according to the protocol of each of said packets at said IP classification engine; and selectively instructing said IP classification engine to permit or deny the flow of IP packets between said data network and said access gateway at said gateway controller.

2. The method of claim 1, wherein a set of rating rules for classifying said IP packets are loaded into said IP classification engine.

3. The method of claim 2, wherein a series of system level triggers in said IP Classification Engine are armed on a real-time basis providing application control for, at least one of protocol state, destination URL or address; or according to said protocol of each said packet, said protocols of each packet including at least one of HTTP, POP3, SMTP, MMS, FTP, and WAP.

4. The method of claim 3, where a series of system level triggers in said IP Classification Engine are armed based on attributes associated with OSI layers 2-7 including protocol-specific attributes and according to said protocol of each said packet, said protocols of each packet including, at least one of HTTP, POP3, SMTP, MMS, FTP, and WAP.

5. The method of claim 4, wherein a decision tree is created based upon a plurality of rating rules for analyzing and determining each packet type.

6. The method of claim 5, wherein each said packet is analyzed using said decision tree.

7. The method of claim 1, wherein said system further comprises an open charging middleware gateway for connection between a subscriber account server and said gateway controller, and wherein said method further comprises:

at said gateway controller, modifying, subscriber information stored in said subscriber account server and associated with said subscriber device according to classes of IP packets as classified by said IP classification engine as said IP packets flow to or from said data network or to or from said access gateway.

8. The method of claim 1, wherein said system further comprises an open charging middleware gateway for connection between a subscriber account server and said gateway controller; said subscriber account server maintaining information associated with said subscriber device, and wherein said method further comprises:

instructing said IP classification engine to deny or redirect the flow of IP packets to or from said data network to or from said subscriber device via said access gateway if subscriber information in said subscriber account server indicates that flow of IP packets is not permitted.

9. The method of claim 1, wherein the access gateway comprises a Gateway GPRS Support Node (GGSN).

10. The method of claim 1, wherein the access gateway comprises a Packet Data Service Node (PDSN).

11. The method of claim 1, where the Authentication, Authorization, and Accounting server comprises a Remote Authentication Dial-In User Service (RADIUS) server.

12. The method of claim 1, further comprising, at said gateway controller, instructing said IP classification engine to redirect traffic from said data network if subscriber information in said subscriber account server indicates that flow of IP packets to or from subscriber device is not permitted.

13. The method of claim 1, further comprising, at said IP classification engine, denying or redirecting IP packets according to how said IP packets are classified.

14. The method of claim 1, wherein said IP packets can be classified according to one or more of: a protocol type, a protocol state, a destination Uniform Resource Locator ("URL"), an address, a time of day, a message content, or a message type.

15. The method of claim 1, further comprising, at said IP classification engine, denying or redirecting IP packets according to a particular protocol into which said IP packets are classified.

16. The method of claim 1, wherein said IP packets can be classified according to one or more of the following protocols: Hyper Text Transfer Protocol ("HTTP"), Post Office Protocol ("POP3"), Simple Mail Transfer Protocol ("SMTP"), File Transfer Protocol ("FTP"), Multi-media Messaging Service ("MMS"), Wireless Application Protocol ("WAP"), Real Time Protocol ("RTP"), and Real Time Streaming Protocol ("RTSP").

17. The method of claim 1, further comprising, at said proxy server, confirming if a subscriber's account is active via either the Lightweight Directory Access Protocol ("LDAP") or the Remote Authentication Dial In User Service ("RADIUS") protocol.

* * * * *